United States Patent [19]
Lee, Jr.

[11] Patent Number: 5,307,800
[45] Date of Patent: May 3, 1994

[54] AFTERBURNER FOR A FUEL-BURNING HEATER AND METHOD OF CONSTRUCTION

[75] Inventor: Joseph B. Lee, Jr., Bowling Green, Ky.

[73] Assignee: DESA International, Inc., Bowling Green, Ky.

[21] Appl. No.: 917,774

[22] Filed: Jul. 21, 1992

[51] Int. Cl.⁵ .......................... F24H 3/02; F23D 14/12
[52] U.S. Cl. .................................. 126/110 B; 431/347; 126/99 R; 29/890.02
[58] Field of Search ................ 431/347, 348; 110/210, 110/211, 213, 217; 432/222, 223; 29/890.02, 890.03, 890.132, 33 R; 126/110 B, 110 R, 99 R, 110 E

[56] References Cited

U.S. PATENT DOCUMENTS

| | | |
|---|---|---|
| 2,966,944 | 1/1961 | Downs ............................ 431/347 X |
| 3,256,003 | 6/1966 | Briggs . |
| 3,301,308 | 1/1967 | Briggs ............................ 432/222 X |
| 3,401,920 | 9/1968 | Berkhoudt et al. . |
| 3,706,446 | 12/1972 | Briggs ............................ 126/116 R X |
| 3,881,863 | 5/1975 | Creuz ............................ 431/347 |
| 4,081,238 | 3/1978 | Briggs et al. ................... 431/343 X |
| 4,098,567 | 7/1978 | Hubbert ......................... 432/223 X |
| 4,098,642 | 5/1978 | Briggs et al. . |
| 4,111,642 | 9/1978 | Kopp ............................. 431/347 |
| 4,313,417 | 2/1982 | Briggs et al. . |
| 4,340,362 | 7/1982 | Chalupsky et al. . |
| 4,424,793 | 1/1984 | Cooperrider . |
| 4,443,187 | 4/1984 | Shaftner et al. . |

FOREIGN PATENT DOCUMENTS

1501854  6/1969  Fed. Rep. of Germany ...... 432/222
0035876  3/1980  Japan .

*Primary Examiner*—Larry Jones
*Attorney, Agent, or Firm*—Jones, Day, Reavis & Pogue

[57] ABSTRACT

An afterburner positionable adjacent the discharge end of a combustion chamber of a fuel-burning heater utilizes a ring portion and a nose cone portion which are constructed as a unit out of a single piece of material. The ring portion accommodates the attachment of the afterburner adjacent the discharge end of the combustion chamber, and the nose cone portion has a skirt including peripheral edge portions which are spaced from and overlap the inner edge portions of the ring portion so that the direction of movement of the flow of products of combustion through the combustion chamber is altered before the combustion products exit the chamber. The afterburner is formed from a single piece of sheet steel in steps involving a first press operation, a lancing operation, and then a second press operation.

33 Claims, 4 Drawing Sheets

AFTERBURNER FOR A FUEL-BURNING HEATER AND METHOD OF CONSTRUCTION

BACKGROUND OF THE INVENTION

This invention relates generally to fuel-burning heaters having combustion chambers and relates, more particularly, to an afterburner for use at the discharge end of the combustion chamber of such a heater.

The type of heater with which this invention is concerned includes a combustion chamber within which the combustion of fuel, such as oil, takes place. The fuel is introduced into the combustion chamber where it is mixed with air and ignited at the inlet end of the chamber, and the resulting products of combustion flow toward and out of the opposite, or discharge, end of the chamber.

Incomplete combustion is not uncommon in heaters of this type due, for example, to the development of droplets of fuel within the combustion chamber which are not uniform in size or to an uneven mixing of the fuel with air prior to combustion. To reduce the likelihood that unburned fuel droplets (e.g., hydrocarbons) escape the heater with the products of combustion, the heater may be provided with an afterburner positioned within the discharge end of the combustion chamber.

The afterburner commonly includes a nose cone portion and a ring portion arranged substantially in the center of the discharge end of the combustion chamber. The nose cone portion is commonly joined to the ring portion with struts which maintain the nose cone portion and ring portion in spaced relationship to provide a passage through which combustion products must exit the heater. During operation of a heater within which an afterburner is positioned, the flow of the products of combustion from the combustion chamber is altered by the nose cone portion so that unburned fuel droplets are forced to contact the afterburner. Since the afterburner normally possesses a relatively high temperature during heater operation due to its exposure and proximity to the combustion reaction, the contact between the unburned fuel droplets and the surface of the afterburner and the exposure to air in the exhaust gases normally completes the combustion process.

Heretofore, afterburners have been constructed with a nose cone portion and a ring portion which are separate pieces. In particular, the ring portion is formed as one piece and the nose cone portion is formed as a second piece separate from that of the ring portion piece. The ring portion and nose cone portion are thereafter attached together with, for example, struts to provide the desired spaced relationship between the ring portion and the nose cone portion. It would be desirable to provide an afterburner which is constructed as a unit out of a single piece of material in order to circumvent costs (e.g., material and labor costs) ordinarily involved in constructing an afterburner of two-piece construction.

Accordingly, it is an object of the present invention to provide a new and improved afterburner for a heater of the aforedescribed class which is constructed as a unit out of a single piece of material and a method of constructing the afterburner.

Another object of the present invention is to provide such an afterburner whose construction reduces the likelihood of warpage or damage to the afterburner or other components of the heater due to thermal expansion and contraction due to heater operation.

Still another object of the present invention is to provide such an afterburner which limits the introduction of direct light into the combustion chamber through the discharge end thereof wherein such indirect light may otherwise result in a false reading by a photocell positioned rearward of the combustion chamber for monitoring the flame within the combustion chamber.

A further object of the present invention is to provide such an afterburner which is economical to construct and effective in operation.

SUMMARY OF THE INVENTION

This invention resides in an afterburner for a fuel-burning heater having a combustion chamber within which fuel is burned and wherein the combustion chamber includes a discharge through which the products of combustion exit the combustion chamber and a method of constructing the afterburner.

The afterburner includes a nose cone portion and a ring portion securable to the remainder of the heater for maintaining the afterburner of the discharge of the combustion chamber. The ring has a central opening, and the nose cone portion is attached to the ring portion so as to be positioned in registry with the central opening thereof. The ring portion has inner edge portions adjacent the central opening which are spaced from the peripheral edge portions of the nose cone portion so that the spacings provided between the inner edge portions of the ring portion and the peripheral edge portions of the nose cone portion provide passageways through which products of combustion are routed. The ring portion and nose cone portion are constructed as a unit out of a single piece of material.

The method of the invention includes the steps involved in making the afterburner of the invention. Such steps include the providing of a blank of sheet metal, and then forming the blank in a first press operation to shape the ring portion and the nose of the nose cone portion. The blank is then lanced to sever the peripheral edge sections of the ring portion from the remainder of the blank along preselected paths so that the edge portions of the nose cone portion are positioned on the side of each preselected path opposite the peripheral edge sections. The blank is subsequently formed in a second press operation so that the nose cone portion is moved in a direction substantially normal to the radial plane of the ring portion to space the edge portions of the nose cone portion from the peripheral edge sections.

DETAILED DESCRIPTION OF THE ILLUSTRATED EMBODIMENT

Figure 1:
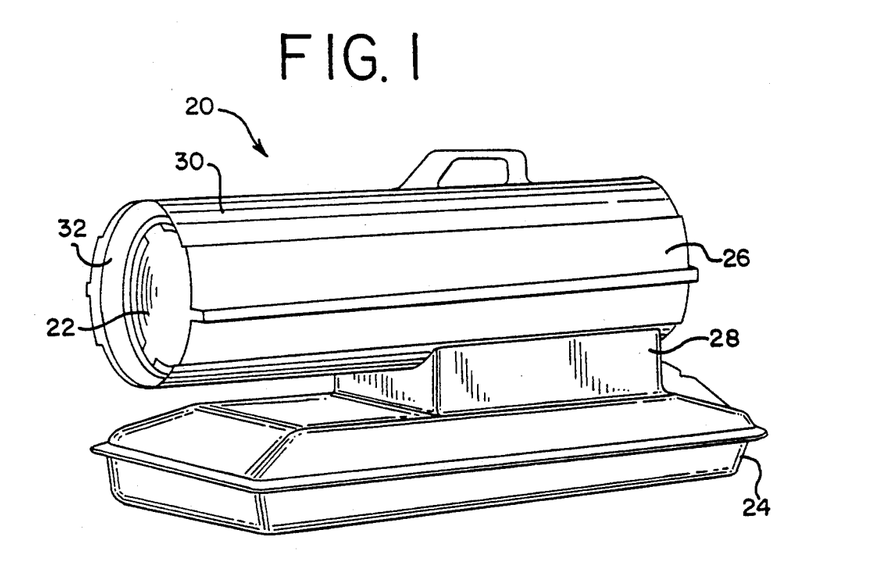
FIG. 1 is a perspective view of a heater within which an embodiment of an afterburner is incorporated.

Turning now to the drawings in greater detail and considering first FIG. 1, there is shown a portable space heater 20 within which an afterburner 22 embodying features of the present invention is utilized. The heater 20 includes a base 24, an elongated housing section 26 superposed upon the base 24, and a support section 28 disposed between so as to join the housing section 26 to the base 24. The housing section 26 includes a combustion chamber, described herein, within which a mixture of fuel and air is burned, and the base 24 contains a reservoir of fuel, such as oil, for burning within the combustion chamber. Routed between the base 24 and housing section 26 is a fuel conduit through which fuel is delivered to the housing section 26, and appropriate controls whose structure and function are well-known in the art are associated with the housing section 26 and support section 28 for controlling the heater operation.

Figure 2:
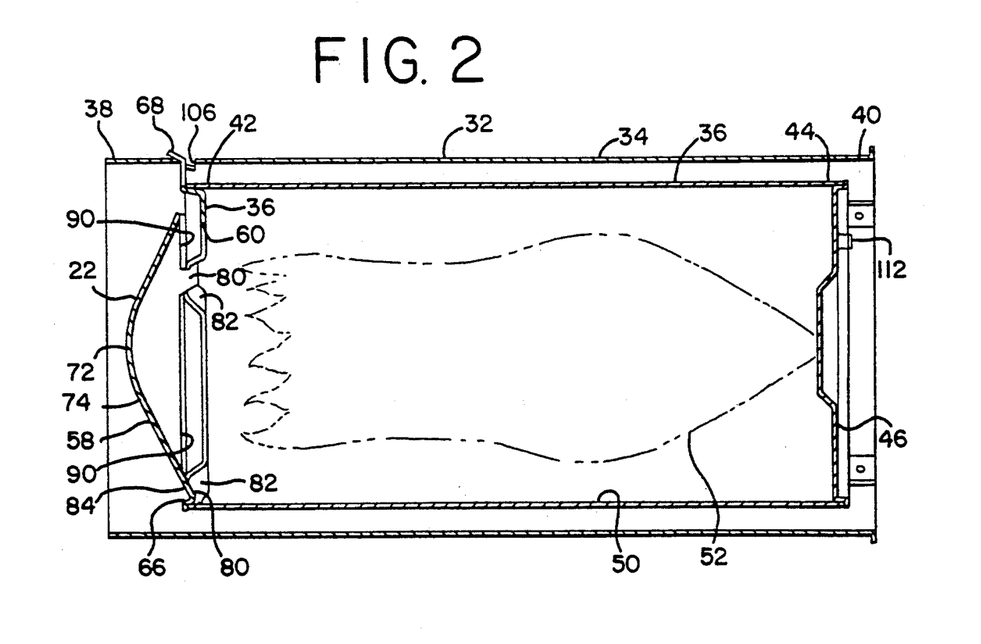
FIG. 2 is a longitudinal cross-sectional view of the combustion chamber assembly of the FIG. 1 heater.

The housing section 26 includes an outer, generally cylindrical housing 30 within which is supported a combustion chamber assembly 32, best shown in FIG. 2. The chamber assembly 32 includes a cylindrical outer shell 34 which provides a heat shield for the assembly 32 and a cylindrical inner shell 36 within which is provided the combustion chamber 50 for the heater 20. The inner shell 36 is arranged substantially centrally of the heat shield 34 so that an annular spacing exists between the inner shell 36 and the heat shield 34. The heat shield 34 has two opposite ends 38 and 40, and the inner shell 36 has two opposite ends 42 and 44 associated with the shield ends 38 and 40, respectively. One end 44 of the inner shell 36 is covered by a rear head 46, and the opposite end 42 of the shell 36 is covered by the afterburner 22. The combustion chamber assembly 32 is supported within the outer housing 30 by, for example, brackets joined between the outer housing 30 and the heat shield 34.

During operation of the heater 20, a mixture of fuel and air is routed into the combustion chamber 50 through a central opening provided in the rear head 46 where it is burned in a combustion process, as depicted by the flame 52 shown in phantom in FIG. 2. If the heater 20 is an oil-burning heater, the fuel may be delivered to the combustion chamber 50 in the form of oil droplets formed by an atomizing process. Regardless of the atomizing process, however, incomplete combustion may occur within the chamber 50 due to a non-uniformity in size of the fuel droplets or an uneven mixing of the fuel droplets with air. The shell end 42 provides the discharge end for the combustion chamber 50, and the afterburner 22 is positioned adjacent the discharge end 42 of the chamber 50 for burning fuel particles which are not burned within the combustion chamber 50 to reduce the likelihood that unburned fuel particles will be discharged from the heater 20 and enter the surrounding environment.

Figure 3:
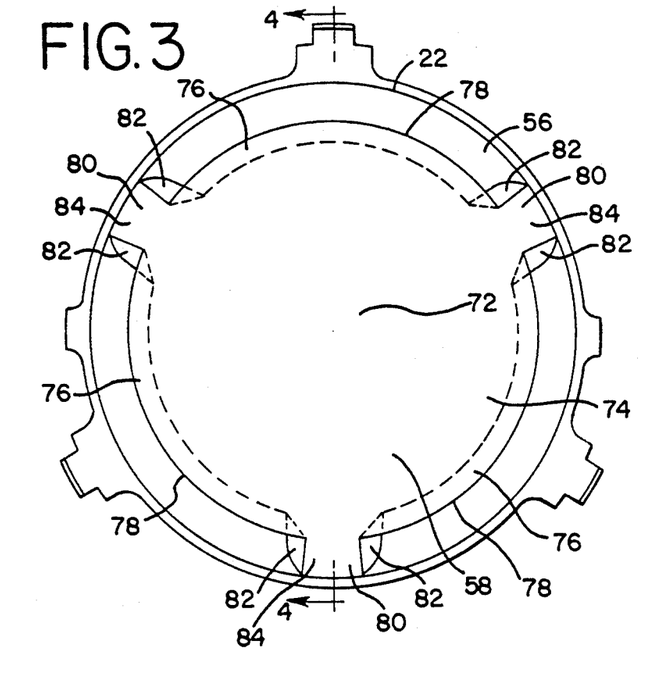
FIG. 3 is a front elevational view of the afterburner of the FIG. 1 heater as viewed generally from the left in FIG. 1.
Figure 4:
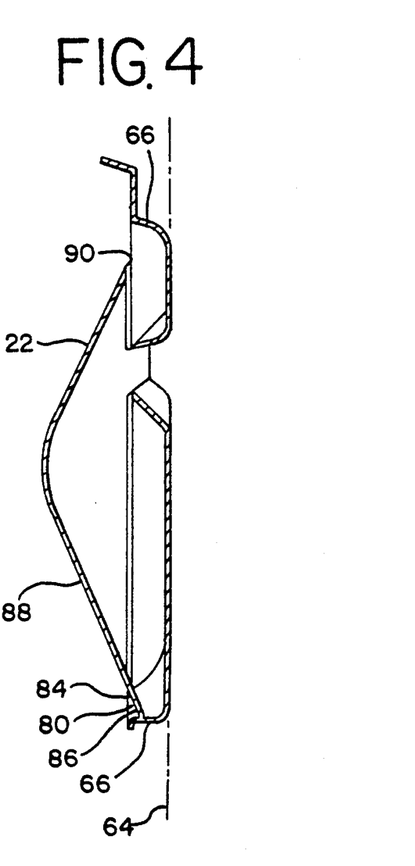
FIG. 4 is a cross-sectional view taken about along line 4—4 of FIG. 3.
Figure 5:
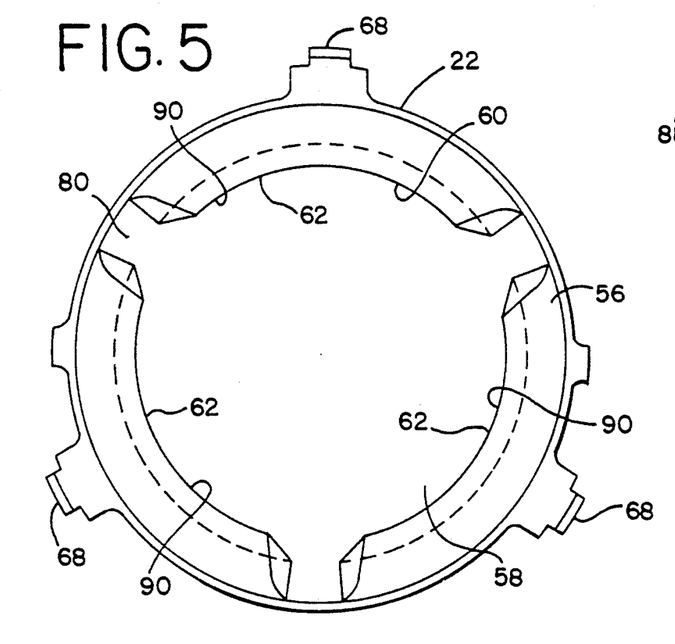
FIG. 5 is a rear elevational view of the afterburner of the FIG. 1 heater as viewed generally from the right in FIG. 4.

With reference to FIGS. 3-5, the afterburner 22 includes a ring portion 56 with which the afterburner 22 is secured within the remainder of the combustion chamber assembly 32 and a nose cone portion 58 integrally joined to the ring portion 56. The ring portion 56 includes a central opening, generally indicated 60, through which the combustion products must flow before exiting the heater 20. Bordering the central portion 60 of the ring portion 56 are three edge sections 62 which are regularly spaced about the opening 60 and which are arranged generally in a common plane, indicated 64 in FIG. 4. The ring portion 56 also includes an annular lip 66 joined to the edge sections 62 so as to extend therearound and a set of tabs 68 joined to so as to extend radially of the annular lip 66. In the depicted afterburner 22, the first set of tabs 68 includes three tabs which are regularly spaced about the annular lip 66 and, as will be apparent herein, are used to secure the afterburner 22 to the heat shield 34.

The nose cone portion 58 includes a rounded nose 72 and a skirt 74 which extends about the nose 72. The skirt 74 includes peripheral edge portions 76 which terminate along edge segments 78 which are regularly spaced about the nose 72. As will be apparent herein, the nose cone portion 58 is arranged in such a relation to the ring portion 56 that the cone portion 58 is positioned in registry with the central opening 60 of the ring portion 56.

It is a feature of the afterburner 22 that the cone portion 58 and ring portion 56 are integrally joined together as a unit out of a single piece of metal. To this end, the ring portion 56 includes three spokes, provided in the depicted embodiment by three channel sections 80, which are disposed between the edge sections 62 so as to protrude out of the plane 64 thereof. Each channel section 80 includes two sides 82 joined by a bridge 84, and each bridge 84 has a surface 86 which is continuous with the surface, indicated 88, of the skirt 74 as illustrated in FIG. 4 so that a path may be traced uninterrupted from the nose 72, across the skirt 74 and bridge 84 to the lip 66. As best shown in FIG. 3, each channel section 80 is spaced generally midway between two tabs 68 as a path is traced along the perimeter of the ring portion 56.

The cone portion 58 is attached to the ring portion 56 by the channel sections 80 and is held in such a relation to the ring portion 56 so that a slot-like spacing 90 exists between each peripheral edge portion 76 of the skirt 74 and a corresponding edge section 62 of the ring portion 56. It is through these slot-like spacings 90 that combustion products are forced to flow as they exit the discharge end 42 of the combustion chamber 50.

It is also a feature of the afterburner 22 that the peripheral edge portions 76 of the skirt 74 overlap the edge sections 62 of the ring portion 56. In other words, as the afterburner 22 is viewed frontally as in FIG. 3, the peripheral edge portions 76 of the skirt 74 are positioned outboard of the edge sections 78 of the ring portion 56.

Figures 6, 7, 8, 9, 10:
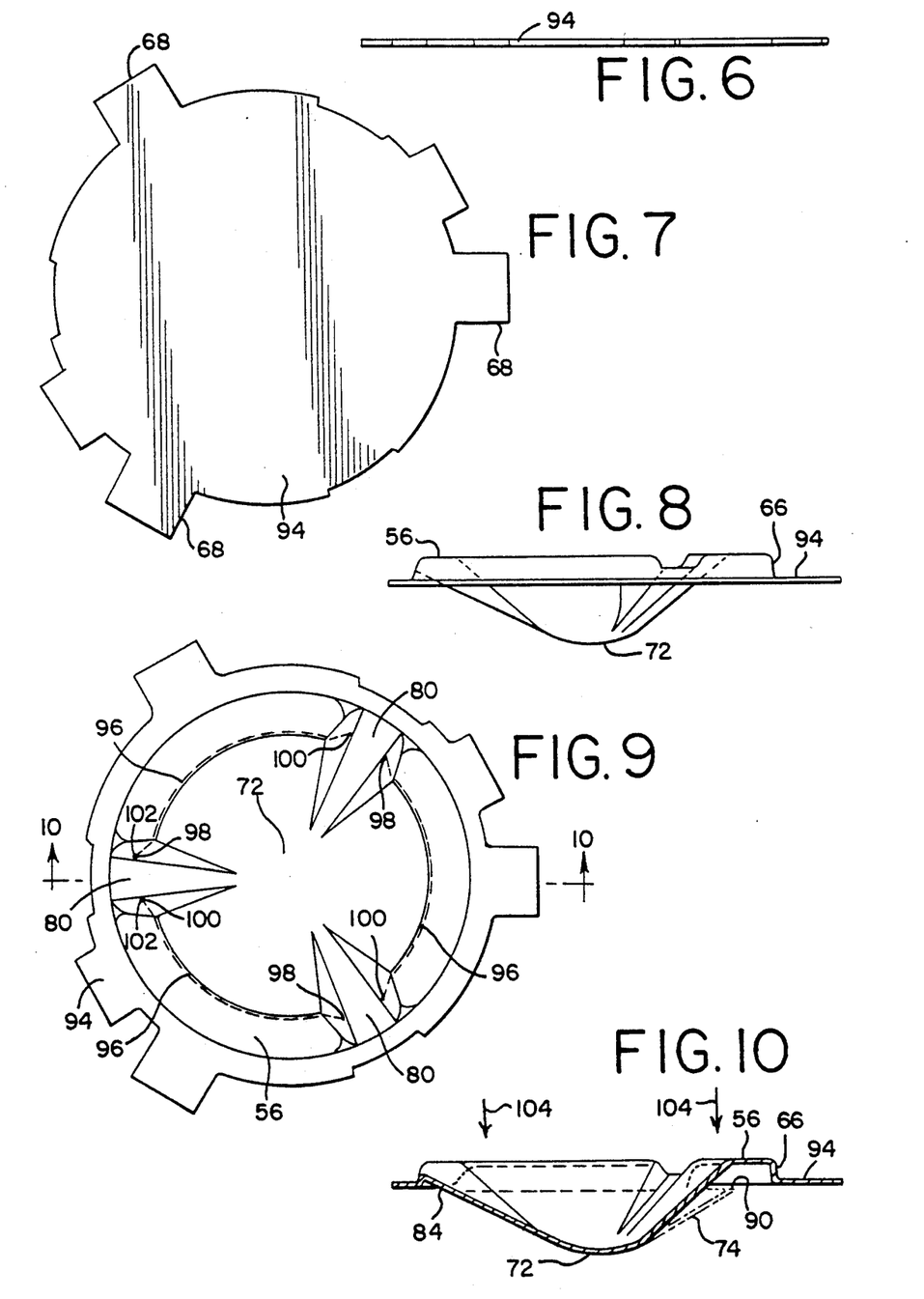
FIGS. 6-10 illustrate the various shapes of a metal blank when formed into the afterburner of the FIG. 1 heater.

To construct the afterburner 22 and with reference to FIGS. 6 and 7, a single sheet of heat-resistant and corrosion-resistant metal, such as Type 430 or 18SR steel, is cut to form a blank 94 so that its peripheral shape approximates that of the final form of the afterburner 22. The blank 94 is then stamped in a stamping operation so that the annular lip 66, nose 72 and channel sections 80 are formed therein as illustrated in FIGS. 8 and 9. At this stage, the channel sections 80 extend from the formed lip 66 to a location adjacent the nose 72 and are therefore longer than they are in the final afterburner form as seen in FIGS. 4 and 5. The blank 94 is then cut in a lancing operation to separate the edges of the edge sections 62 of the ring portion 56 from the portions of the blank 94 which will subsequently form the peripheral edge sections 76 of the skirt 74. Accordingly, three cuts, or slits, are formed in the blank 94 along paths designated in FIG. 9 as dotted lines 96. As viewed in FIG. 9, each of these paths 96 extend from a location 98 on one channel section 80 to a location 100 on an adjacent channel section 80, but not through the bridge of the channel section 80. If desired, holes 102 may be provided at each location identified 98 or 100 to reduce the likelihood that each cut formed by the lancing operation will extend beyond its desired length.

The lanced 94 blank is then restruck in a second stamping operation so that the impact of this stamping operation moves the peripheral edge portions 76 of the skirt 74 relative to the edge sections 62 of the ring portion 56 in the direction of the FIG. 10 arrows 104 from the condition illustrated in solid lines in FIG. 10 to the condition illustrated in phantom in FIG. 10. More specifically, the interior of the peripheral edge portions 76 is appropriately pressed so that the portions of the channel sections 80 disposed radially inwardly of the several paths 96 (FIG. 9) permit the material of the cone portion 58 to spread, or splay, to an alternative, i.e., shallower, depth and grow in diameter to provide the desired overlap between the cone portion 58 and ring portion 56. The tool used to stamp the blank 94 in this second stamping operation is suitably formed so that the portions of the channel sections 80, as viewed in FIG. 9, disposed radially inwardly of the several paths 96 are shaped to a condition at which the cone portion is provided with its smooth, conical appearance as illustrated in FIG. 4. At the completion of the second stamping operation, the blank 94 may be trimmed and/or deburred to finish the afterburner 22.

An advantage provided by the one-piece construction of the afterburner 22 relates to its cost of production as well as to its stability, i.e., rigidity, during use. In particular, material waste which is normally associated with the construction of a comparable afterburner of multi-piece construction, is circumvented and the labor, such as assembly and handling, which is otherwise necessary to secure the multiple components together is obviated.

To secure the afterburner 22 within the heat shield 34 and with reference again to FIG. 2, the heat shield 34 is provided with three slots 106 which are radially spaced thereabout adjacent the end 38 for accepting the tabs 68 of the afterburner 22. In the depicted heat shield 34, the slots 106 are keyhole-shaped, but the slots 106 may possess any of a number of alternative configurations. To install the afterburner 22 within the heat shield 34, the tabs 68 are bent forwardly as viewed in FIG. 4 and the afterburner 22 is inserted through the heat shield end 38 so that two tabs 68 are directed through two of the corresponding slots 106 provided in the heat shield 34. The heat shield 34 is then temporarily deformed so that the third tab 68 of the afterburner 22 is accepted by the third slot 106 of the heat shield 34. With the three tabs 68 accepted by the heat shield slots 106, the afterburner 22 is positively retained within the chamber assembly 32 without the aid of welds or mechanical fasteners. The inner shell 36 is thereafter positioned within the heat shield 34 through the end 40 thereof so that the discharge end 42 of the inner shell 36 closely accepts the lip 66 of the ring portion 56. The tabs 68 prevent the acceptance of the whole afterburner 22 by the shell end 42. The rear head 46 is then positioned and secured within the end 44 of the inner shell 36 as shown in FIG. 2. The completed combustion chamber 50 is subsequently installed within the outer housing 30 (FIG. 1) of the heater 20.

Figure 11:
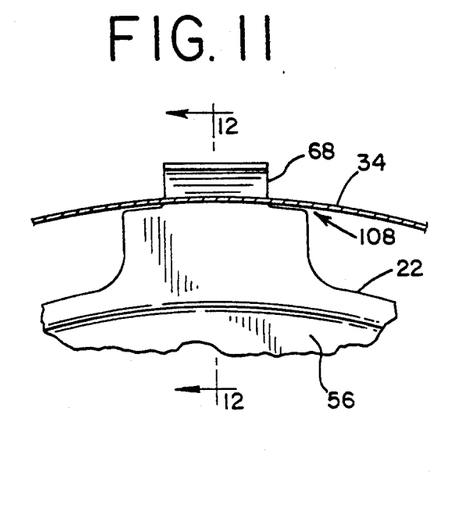
FIG. 11 is a front elevational view of a fragment of the FIG. 1 heater illustrating the relative position of the heater components when at ambient temperature.
Figure 12:
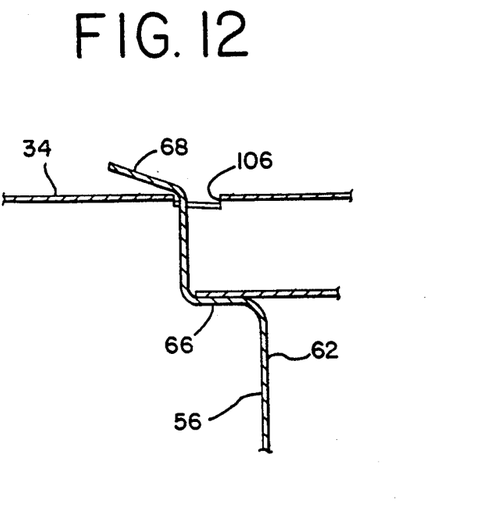
FIG. 12 is a cross-sectional view taken along line 12—12 of FIG. 11.
Figure 13:
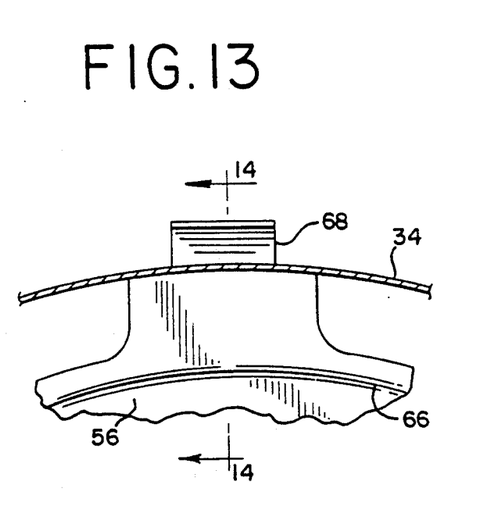
FIG. 13 is a view similar to that of FIG. 11 illustrating the relative position of the heater components during operation of the heater.
Figure 14:
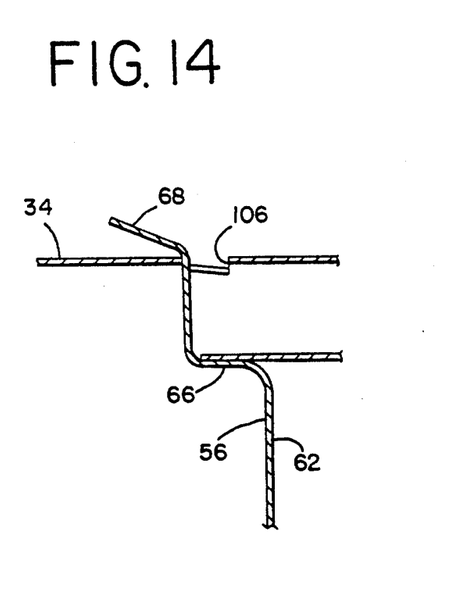
FIG. 14 is a cross-sectional view taken along line 14—14 of FIG. 13.

With the tabs 68 accepted by the slots 106 of the heat shield 34, the afterburner 22 is permitted to float within the remainder of the chamber assembly 32 during operation of the heater 20. This permitted floatation of the afterburner 22 is advantageous in view of the fact that the components (i.e., the inner shell 36, the afterburner 22 and the heat shield 34) of the assembly 32 operate at different temperatures during heater operation and, accordingly, expand or contract by different amounts. FIGS. 11 and 12 illustrate the position of the tabs 68 of the afterburner 22 relative to the heat shield 34 at ambient temperature while FIGS. 13 and 14 illustrate the position of the afterburner tabs 68 relative to the heat shield 34 during normal operating conditions. In particular, each slot 106 provided in the heat shield 34 permits its corresponding tab 68 to shift forwardly or rearwardly relative to the heat shield 34 between a contracted condition as illustrated in FIG. 12 and an expanded condition as illustrated in FIG. 14 to accommodate a change in relative size of the components when cooled or heated. Moreover, a predetermined clearance, indicated 108 in FIG. 11, between the inner wall of the heat shield 34 and a shoulder provided in the corresponding tab 68 accommodates a radial expansion or contraction of the afterburner 22 relative to the heat shield 34. The aforediscussed cooperation between the tabs 68 and slots 106 prevents the exposure of the afterburner 22 to undue stresses during expansion or contraction of the heater components and, accordingly, reduces any likelihood of component warpage due to varying rates of thermal expansion.

Any likelihood of warpage of the afterburner 22 is further reduced and controlled by the spacing provided between the tabs 68 and the channel sections 80 as a path is traced around the periphery of the ring portion 56. If the afterburner tabs 68 contact the front edge, or the left edge as viewed in FIGS. 12 and 14, of the heat shield slots 106 before full operating temperature is reached, the tabs 68 will deform slightly at the annular lip 66 to accommodate some additional expansion. If yet more expansion must be accommodated, the spacing between the tabs 68 and the channel sections 80 limit the resulting afterburner warpage to the ring portion 56. This warpage will act only to slightly increase the slot-like spacings 90 between the edge portions 76 of the skirt 74 and the corresponding edge sections 62 of the ring portion 56 thereby effectively increasing the open area of the afterburner 22. By controlling any resulting warpage in this manner, improper combustion due to afterburner warpage is avoided.

During use of the heater 22, and with reference again to FIG. 2, combustion products move forwardly through the combustion chamber 50 toward the discharge end 42 thereof. As the combustion products approach the afterburner 22 along a substantially axial path through the chamber 50, the combustion products are forced to turn radially outward by the interior of the cone portion 58 toward the spacings 90. However, the axial momentum of unburned fuel particles contained within the flow normally carries the particles into contact with the cone portion 58. Since the temperature of the cone portion is relatively high (e.g., greater than 1,100° F.) during heater operation, the contact of the fuel particles with the cone portion 58, together with excess air contained within the flow, completes the burning of the particles. The aforedescribed overlap between the cone portion 58 and ring portion 56 ensures that the entirety of the flow of combustion products is forced to change in direction prior to its exit from the discharge end 42 and is advantageous in this respect.

Another advantage provided by the aforedescribed overlap between the cone portion 58 and ring portion 56 relates to the limiting of the entry of direct light through the discharge end 42 of the chamber 50. Such an advantage can be readily appreciated when considering the fact that several heaters of this class employ a photoelectric resistance cell to monitor flame conditions within the combustion chamber 50. For example, there is illustrated in FIG. 2, a photoelectric resistance cell 112 which has been mounted upon the rear head 46 so as to be exposed to the flame 52 of combustion through a window provided in the rear head 46. During use of the heater 20, the photocell 112 transmits a DC resistance signal to a separate safety circuit (not shown) which turns off the heater 20 if there is a decrease in flame intensity caused by, for example, a fuel rich mixture, a fuel lean mixture or a loss of flame conditions. If, of course, direct light is allowed to enter the combustion chamber 50 through the discharge end 42, false photocell readings may result. However, the overlap provided between the cone portion 58 and the ring portion 56 limits the entry of direct light into the discharge end 42 and thereby reduces the likelihood of a false reading by the photocell 112.

It will be understood that numerous modifications and substitutions can be had to the aforedescribed embodiments without departing from the spirit of the invention. Accordingly, the aforedescribed embodiment is intended for the purpose of illustration and not as limitation.

I claim:

1. An afterburner for a fuel-burning heater having a combustion chamber within which fuel is burned and wherein the combustion chamber includes a discharge through which the products of combustion exit the combustion chamber, said afterburner comprising:
   a ring portion generally perpendicular to the movement of combustion products and securable to the remainder of the heater for maintaining the afterburner adjacent the discharge of the combustion chamber and having a central opening;
   a nose cone portion attached to first inner edge sections of the ring portion so as to be positioned substantially in registry with the central opening thereof and including peripheral edge sections;
   the ring portion having second inner edge sections adjacent the central opening which are spaced longitudinally from the peripheral edge portions of the nose cone portion so that the spacings provided between the second inner edge sections and the peripheral edge portions of the nose cone portion provide passage ways through which products of combustion exit the combustion chamber; and
   the ring portion and the nose cone portion are constructed as a unit out of a single piece of material.

2. The afterburner as defined in claim 1 wherein the single piece of material out of which the afterburner is constructed is a piece of sheet steel.

3. The afterburner as defined in claim 1 wherein the peripheral edge portions of the nose cone portion are positioned outboard of so as to overlap the second inner edge sections of the ring portion to ensure that the direction of movement of combustion products through the combustion chamber is altered before the combustion products exit the chamber through the passageway-providing spacings.

4. The afterburner as defined in claim 1 wherein the ring portion includes at least two spokes, each disposed between two adjacent second inner edge sections for joining the ring portion to the nose cone portion.

5. The afterburner as defined in claim 4 wherein the nose cone portion has a nose and a skirt encircling the nose and having a surface which slopes from the nose toward the peripheral edge portions, and the spoke include a bridge portion which is joined to the skirt adjacent the peripheral edge portions and has a slope which corresponds generally to that of the surface of the skirt so that a surface of the bridge portion is substantially continuous with the surface of the skirt.

6. The afterburner as defined in claim 4 wherein the ring portion is provided with a plurality of spokes which are regularly spaced about the central opening of the ring portion.

7. The afterburner as defined in claim 4 wherein the ring portion is securable to the remainder of the heater at three locations along each circumference of the ring portion, and the spoke is disposed generally between the two adjacent locations as a path is traced about the circumference of the ring portion.

8. The afterburner as defined in claim 7 wherein each spoke is positioned substantially midway between the two adjacent locations as a path is traced about the circumference of the ring portion.

9. The afterburner as defined in claim 1 wherein the heater includes means providing a preformed opening adjacent the discharge of the combustion chamber and the ring portion includes a radially outwardly-extending tab positionable within and cooperable with the preformed opening to accommodate a shift in position of the afterburner longitudinally of the combustion chamber in response to a change in temperature of the combustion chamber.

10. An afterburner for a fuel-burning heater having a combustion chamber and wherein the combustion chamber includes a discharge end through which products of combustion exit the combustion chamber, the afterburner comprising:
   a ring portion generally perpendicular to the movement of combustion products and securable to the remainder of the heater for maintaining the afterburner adjacent the discharge end of the combustion chamber and having a central opening;
   a nose cone portion attached to first inner edge sections of the ring portion so as to be positioned substantially in registry with the central opening thereof and including peripheral edge portions, and the ring portion having second inner edge sections adjacent the central opening which are spaced longitudinally from the peripheral edge portions of the nose cone portion so that the spacings provided between the second inner edge sections and the peripheral edge portion of the nose cone portion provide passage ways through which products of combustion move through the afterburner;
   the peripheral edge portions and the second inner edge portions are in overlapping relationship so that the flow of combustion products exiting the discharge of the combustion chamber is changed in direction as the flow moves through the passageway-providing spacings of the afterburner; and the ring portion and nose cone portion are constructed as a unit of a single piece of material.

11. The afterburner as defined in claim 10 wherein the ring portion includes at least two spokes, each disposed between two adjacent second inner edge sections for joining the ring portion to the nose cone portion, and the ring portion is securable to the remainder of the heater at three locations along the circumference of the ring portion, and each spoke is disposed generally midway between the two adjacent locations as a path is traced about the circumference of the ring portion.

12. The afterburner as defined in claim 10 wherein the heater includes means providing a preformed opening adjacent the discharge end of the combustion chamber thereof and the ring portion includes a radially outwardly-extending tab positionable within and cooperable with the preformed opening to accommodate a shift in position of the afterburner longitudinally of the combustion chamber in response to a change in temperature of the combustion chamber.

13. The afterburner as defined in claim 12 wherein the ring portion includes at least two spokes joining the ring portion to the nose cone portion and the tab of the ring portion is positioned about midway between a pair of adjacent spokes as a path is traced generally along the circumference of the ring portion.

14. The afterburner of claim 10, wherein the ring portion is generally perpendicular to the movement of combustion products.

15. An afterburner positionable adjacent the discharge end of the fuel-burning heater through which products of combustion exit the heater, said afterburner comprising:

a nose cone portion having a nose and a skirt extending about the nose and terminating in peripheral edge portions, the nose cone portion being arranged substantially centrally of the discharge end of the heater and oriented so that the nose of the nose cone portion is directed in a downstream direction relative to the flow of combustion products through the discharge end and adjacent the discharge end;

a ring portion generally perpendicular to the movement of combustion products and securable to the remainder of the heater for maintaining the afterburner in position adjacent the discharge end and attached to the heater so as to support the nose cone portion centrally of the discharge end as aforesaid, the ring portion including a central opening and inner edge sections adjacent the central opening, the inner edge sections being disposed upstream of the nose cone portion when the ring portion is secured to the remainder of the heater, the ring portion including a plurality of spokes integrally formed with and joined to the nose cone portion so that the peripheral edge portions of the nose portion and the inner edge sections are spaced longitudinally from one another so that the spacings therebetween provide passageways through which products of combustion are directed as the combustion products exit the heater, the peripheral edge portions and the inner edge sections disposed in an overlapping relationship as the afterburner is viewed in a direction corresponding with the downstream direction of flow of combustion products through the discharge end.

16. The afterburner as defined in claim 15 wherein each spoke of the ring portion is positioned generally between two adjacent inner edge sections for joining the ring portion to the nose cone portion, and the ring portion is securable to the remainder of the heater at two locations along the circumference of the ring portion, and each spoke is disposed generally midway between the two locations as a path is traced about the circumference of the ring portion.

17. The afterburner as defined in claim 15 wherein the heater includes means providing a preformed opening adjacent the discharge end of the heater and the ring portion includes a radially outwardly-extending tab positionable within and cooperable with the preformed opening to accommodate a shift in position of the afterburner longitudinally of the heater.

18. The afterburner of claim 15, wherein the ring portion is generally perpendicular to the movement of combustion products.

19. An afterburner for use with a fuel-burning heater having a combustion chamber assembly having an inner shell providing a combustion chamber for the heater and having a discharge end and an outer shell positioned about the inner shell and provided with preformed openings adjacent the discharge end of the inner shell, the afterburner comprising:

a ring portion generally perpendicular to the movement of combustion products and having a central opening;

a nose cone portion attached to first inner edge sections of the ring portion so as to be positioned in registry with the central opening thereof and including peripheral edge sections;

the ring portion having second inner edge sections adjacent the central opening which are spaced longitudinally from the peripheral edge portions of the nose cone portion so that the spacings provided between the second inner edge sections and the peripheral edge portions of the nose cone portion provide passage ways through which products of combustion exit the combustion chamber; and the ring portion including a plurality of tabs associated with the inner edge sections so as to extend radially outwardly therefrom and cooperable with the inner shell and outer shell so that when the afterburner is disposed in an operative position adjacent the discharge end of the inner shell, each tab is received by a corresponding one of the preformed openings provided in the outer shell and so that as the inner shell lengthens and contracts relative to the outer shell in response to a change in temperature of the inner shell, each tab of the ring portion is permitted to move within its corresponding preformed opening to accommodate a change in position of the afterburner longitudinally of the outer shell.

20. The afterburner as defined in claim 19 wherein the second inner edge sections of the ring portion and the peripheral edge sections of the nose cone portion are in overlapping relationship so that the flow of combustion products moving out of the inner shell through the passageway-providing spacings of the afterburner is altered in direction by the overlapping inner edge sections and peripheral edge portions.

21. The afterburner of claim 19, wherein the ring portion is generally perpendicular to the movement of combustion products.

22. A combustion chamber assembly for a fuel-burning heater comprising:
  an inner shell providing a combustion chamber for the heater and including an inlet end through which fuel and air enter the chamber for ignition and an opposite discharge end through which products of combustion exit the combustion chamber;
  an outer shell supported in a spaced relation about the inner shell and having means disposed adjacent the discharge end of the inner shell providing at least one preformed opening;
  an afterburner including:
  (a) a ring portion generally perpendicular to the movement of combustion products and positioned adjacent the discharge end of the inner shell and having a central opening; and
  (b) a nose cone portion attached to first inner edge sections of the ring portion and supported in registry with the discharge end of the inner shell, the ring portion having second inner edge sections adjacent the central opening which are spaced longitudinally from the peripheral edge portions of the nose cone portion so that the spacings provided between the second inner edge sections and the peripheral edge portions of the nose cone portion provide passageways through which products of combustion exit the combustion chamber; and
  the ring portion including at least one tab joined thereto so as to extend radially outwardly from the inner edge sections and wherein each tab is accepted by a corresponding preformed opening provided in the outer shell, the ring portion cooperating with the inner shell and outer shell so that as the inner shell lengthens and contracts relative to the outer shell in response to a change in temperature of the inner shell, each tab of the ring portion is permitted to shift within its corresponding preformed opening to accommodate a shift in position of the afterburner along the length of the outer shell.

23. The combustion chamber assembly as defined in claim 22 wherein the discharge end of the inner shell terminates in a plane oriented generally perpendicular to the longitudinal axis of the inner shell, and the preformed openings provided in the outer shell and within which the tabs are received are oriented substantially in the plane in which the discharge end terminates.

24. The combustion chamber assembly as defined in claim 22 wherein the second inner edge sections of the ring portion and the peripheral edge portions of the nose cone portion are in overlapping relationship so that the f low of combustion products moving through the inner shell is forced to change its direction as the combustion products move through the passageways-providing spacings of the afterburner.

25. The combustion chamber assembly as defined in claim 22 wherein the ring portion includes a plurality of spokes joining the ring portion to the nose cone portion and each tab of the ring portion is positioned generally between each pair of adjacent spokes as a path is traced along the perimeter of the ring portion.

26. The combustion chamber assembly as defined in claim 25 wherein each tab is disposed about midway between each pair of adjacent spokes as a path is traced along the perimeter of the ring portion.

27. The combustion chamber assembly of claim 22, wherein the ring portion is generally perpendicular to the movement of combustion products.

28. A method of making an afterburner for the combustion chamber of a fuel-burning heater wherein the afterburner is to include a ring portion securable to the remainder of the heater and a nose cone portion and wherein the ring portion is to include a central opening and inner edge sections adjacent the central opening and the nose cone portion is to include peripheral edge portions which are spaced from the inner edge sections of the ring portion, the method including the steps of:
  providing a blank of sheet metal;
  forming the blank in a first press operation to shape the ring portion and the nose of the nose cone portion;
  lancing the blank to sever the inner edge sections of the ring portion from the remainder of the blank along preselected paths so that the peripheral edge portions of the nose cone portion are disposed on the side of each preselected path opposite the corresponding inner edge section;
  forming the blank in a second press operation so that the peripheral edge portions of the nose cone portion are moved in a direction having a component oriented substantially normal to the radial plane of the ring portion to space the peripheral edge portions of the nose cone portion from the inner edge sections.

29. The method as defined in claim 28 wherein the step of forming the blank in the first press operation includes the step of forming at least one spoke in the blank which extends generally radially thereacross so as to span the expected boundary between the nose cone portion and the ring portion, and the step of lancing leaves at least a part of the spoke unsevered so that following the second press operation, the nose cone portion and ring portion are joined by the unsevered part of the spoke.

30. The method as defined in claim 29 wherein the ring portion has two preselected locations at which the ring portion is to be secured to the remainder of the heater within which the afterburner is used, and the step of forming at least one spoke in the blank positions the one spoke between the two preselected locations as a path is traced around the periphery of the ring portion.

31. The method as defined in claim 29 wherein the first press operation forms a plurality of spokes in the blank which are regularly spaced about the ring portion, and the step of lancing leaves uncut a part of each spoke so that following the second press operation, the nose cone portion and ring portion are joined by the unsevered part of each spoke.

32. The method as defined in claim 30 wherein the step of forming at least one spoke in the blank positions the one spoke substantially midway between the two preselected locations as a path is traced around the periphery of the ring portion.

33. The method as defined in claim 28 wherein the second press operation effects a splaying of said peripheral edge portions of said nose cone portion outwardly with respect to the nose of the nose cone portion to a condition at which the peripheral edge portions of the nose cone portion are positioned so as to overlap the inner edge sections of the ring portion.

* * * * *